United States Patent [19]

Gill et al.

[11] Patent Number: 4,933,090

[45] Date of Patent: Jun. 12, 1990

[54] METHOD FOR CONTROLLING SILICA/SILICATE DEPOSITION IN AQUEOUS SYSTEMS USING PHOSPHONATES AND CARBOXYLIC/SULFONIC POLYMERS

[75] Inventors: Jasbir S. Gill; Susan P. Rey, both of Corapolis; John H. Wiernik, Pittsburgh, all of Pa.

[73] Assignee: Calgon Corporation, Pittsburgh, Pa.

[21] Appl. No.: 290,798

[22] Filed: Dec. 28, 1988

Related U.S. Application Data

[63] Continuation of Ser. No. 137,139, Dec. 23, 1987, abandoned.

[51] Int. Cl.$^5$ .................................................. C02F 5/14
[52] U.S. Cl. ................................ 210/700; 210/701; 252/180
[58] Field of Search .............................. 210/696–701; 252/180, 181

[56] References Cited

U.S. PATENT DOCUMENTS

| | | | |
|---|---|---|---|
| 4,217,216 | 8/1980 | Lipinski | 210/700 |
| 4,328,106 | 5/1982 | Harrar et al. | 210/700 |
| 4,497,713 | 2/1985 | Geiger | 210/699 |
| 4,510,059 | 4/1985 | Amjad et al. | 210/701 |
| 4,532,047 | 7/1985 | Dubin | 210/696 |
| 4,618,448 | 10/1986 | Cha et al. | 210/701 |
| 4,640,793 | 2/1987 | Persinski et al. | 210/700 |

*Primary Examiner*—Peter Hruskoci
*Attorney, Agent, or Firm*—W. C. Mitchell; M. C. Sudol, Jr.; W. H. Nicholson

[57] ABSTRACT

This invention is directed to a method for controlling the formation of silica/silicate deposits in aqueous systems by adding an effective amount, preferably at least 0.1 ppm, of a designated phosphonate and, optionally, a carboxylic/sulfonic polymer or salt thereof to the aqueous system being treated. Borate or molybdate ion sources may also be added.

5 Claims, No Drawings

METHOD FOR CONTROLLING SILICA/SILICATE DEPOSITION IN AQUEOUS SYSTEMS USING PHOSPHONATES AND CARBOXYLIC/SULFONIC POLYMERS

This application is a continuation of Ser. No. 137,139, filed Dec. 23, 1987, now abandoned.

BACKGROUND OF THE INVENTION

U.S. Pat. No. 3,928,196 discloses the use of copolymers of 2-acrylamido-2-methylpropylsulfonic acid and acrylic acid as scale inhibitors.

U.S. Pat. No. 4,640,793 discloses the use of admixtures containing carboxylic acid/sulfonic acid polymers and phosphonates as scale and corrosion inhibitors.

U.S. Pat. No. 4,618,448 discloses the use of polymers comprising an unsaturated carboxylic acid, an unsaturated sulfonic acid and an unsaturated polyalkylene oxide as scale inhibitors.

Japanese No. 57-084794 discloses the use of copolymers of acrylic acid and allyl polyethylene glycol as scale inhibitors.

European patent application No. 84301450.7 discloses carboxylic acid/sulfonic acid copolymers in combination with organic phosphonates as scale inhibitors.

U.S. Pat. No. 4,510,059 discloses the use of carboxylic functional polyampholytes to reduce silica deposits in aqueous systems.

U.S. Pat. No. 4,532,047 discloses a method of inhibiting amorphous silica scale formation using polypolar organic compounds and borate ion sources.

U.S. Pat. No. 4,584,104 discloses a method of inhibiting amorphous silica scale formation using a source of orthoborate ions.

Silica/silicate deposition in aqueous systems, for example boilers, cooling towers and systems containing hypersaline geothermal brines, is a continuing problem. Traditionally, deposition has been controlled by softening the makeup water to the system being treated, by blowdown, or by both. If deposition occurs, mechanical removal or washing with ammonium fluoride or hydrofluoric acid is generally the method of control. Obviously, mechanical or chemical cleaning causes down time and increased energy and labor costs.

pH affects the ionization of silanol groups and, therefore, affects the polymerization rate. Silica first forms, then three dimensional networks form. Eventually, colloidal particles grow through condensation. At pH 7, nuclei formation and particle growth is very rapid. The pH of cooling water is generally 6.0 to 8.5 and the water temperature is generally about 30° to 70° C. The pH of geothermal brines is generally 4.0 to 6.0 and the brine temperatures is generally about 100° to 210° C.

It is known to use cationic polymers or cationic surfactants as silica scale inhibitors in hypersaline geothermal brines (Harrar, J. E. et al, "Final Report on Tests of Proprietary Chemical Additives as Anti-scalants for Hypersaline Geothermal Brine", January 1980, Lawrence Livermore Laboratory, Harrar, J. E. et al, "On-Line Tests of Organic Additives for the Inhibition of the Precipitation of Silica from Hypersaline Geothermal Brine IV, Final tests of Candidate Additives", February 1980. Lawrence Livermore Laboratories; and Harrar, J. E. et al, "Studies of Scale Formation and Scale Inhibitors at the Salton Sea Geothermal Field", Corrosion/80. Paper No. 225, International Corrosion Forum, devoted exclusively to the Protection and Performance of Materials, Mar. 3–7, 1980. Chicago, IL).

The inventors have discovered a method for controlling the deposition of silica and silicates in an aqueous system using a phosphonate selected from the group consisting of hexamethylene diamine tetra(methylene phosphonic acid), diethylene triamine penta(methylenephosphonic acid), salts of these compounds and combinations thereof, alone or optionally in combination with a water soluble polymer prepared from at least one carboxylic acid moiety, at least one sulfonic acid moiety and, optionally, at least one polyalkylene oxide moiety. While the designated phosphonates alone are effective inhibitors, the designated polymers enhance performance. The instant phosphonates, when added to waters containing silica and hardness at a pH of about 9.0, prevent the formation of silicates and their deposition. The instant method has been shown to effectively maintain up to 300 mg/L $SiO_2$ and greater than 200 mg/L hardness without substantial deposition on heat exchanger surfaces.

DETAILED DESCRIPTION OF THE INVENTION

The instant invention is directed to a method for controlling silica/silicate deposition in an aqueous system comprising adding an effective amount of (A) a water soluble phosphonate selected from the group consisting of hexamethylenediamine tetra(methylene phosphonic acid), diethylene triamine penta (methylene phosphonic acid), salts of these compounds and combinations thereof; and optionally, (B) a water soluble polymer having an intrinsic viscosity of about 0.05 to 2.5 dl/g to the system being treated, wherein polymer (B) is prepared from:

(a) 35 to 95%, by weight, of an unsaturated carboxylic acid, or salt thereof;

(b) 5 to 65%, by weight, of an unsaturated sulfonic acid, or salt thereof; and, (c) 0 to 40%, by weight, of an unsaturated polyalkylene oxide compound.

Low molecular weight polymers of acrylic acid and/or methacrylic acid can also be used as (B). The preferred polymers of this type have molecular weights less than about 20,000.

If (B) is used, the ratio of (A):(B), by weight, should range from about 1:10 to about 10:1, preferably from about 1:3 to about 3:1.

Additionally, if (B) is used, a molybdate ion or a borate ion source may be added. Molybdate ions are preferred, as molybdate-containing compositions unexpectedly solubilize species such as calcium ions, magnesium ions and $SiO_2$. Any source borate ions can be used. The preferred molybdate source is ammonium molybdate, and the preferred borate sources are described in U.S. Pat. Nos. 4,504,104 and 4,532,047, which are hereby incorporated into this specification by reference. If a molybdate or borate is used as component (C), the weight ratio of components (A) and (C) should range from about 1:5 to about 5:1. The preferred compositions contain A:B:C weight ratios of about 1:1:2.

An effective amount of the phosphonate should be added to the aqueous system being treated. As used herein, the term "effective amount" is that amount necessary to control silica/silicate deposition in the system being treated. Generally, the effective amount will range from about 0.1 to about 200 ppm, on an active basis, based on the total weight of the aqueous system being treated, preferably from about 1 to about 200 ppm.

As used herein, the term "controlling silica/silicate deposition" is meant to include inhibition of silica polymerization, threshold precipitation inhibition, stabilization, dispersion, solubilization, and/or particle size reduction of silica, silicates, especially calcium and magnesium silicates, and silicon ions. Clearly, the instant additives are threshold silicate precipitation inhibitors, but they also stabilize, disperse and solubilize silica and silicates. Thus, the inventors have discovered that the designated phosphonates, alone or in combination with the designated polymers and, optionally, a molybdate or borate source, inhibit, minimize or prevent silica deposition under severe operating conditions, and intend that the instant specification describe this discovery, without attempting to describe the specific mechanism by which silica/silicate deposition is prevented or inhibited.

The term "aqueous system", as used herein, is meant to include any type of system containing water, including, but not limited to, cooling water systems, boiler water systems, desalinations systems, gas scrubber water systems, blast furnace water systems, reverse osmosis systems, evaporator systems, paper manufacturing systems, mining systems and the like.

If a polymer is used with the instant phosphonates, any unsaturated water soluble carboxylic acid or salt may be used as component (a) to prepare the polymer. Examples include, but are not limited to, acrylic acid, methacrylic acid, α-halo acrylic acid, maleic acid, itaconic acid, vinyl acetic acid, allyl acetic acid, fumaric acid, β-carboxyethyl acrylate, their salts and admixtures thereof. The preferred carboxylic acids are acrylic acid and methacrylic acid and their salts. The most preferred carboxylic acid is acrylic acid.

Any water-soluble unsaturated sulfonic acid or salt thereof may be used as moiety (b). Examples include, but are not limited to, 2-acrylamido-2-methylpropylsulfonic acid, 2-methacrylamido-2-methylpropylsulfonic acid, styrene sulfonic acid, vinyl sulfonic acid, sulfo alkyl acrylate or methacrylate, allyl sulfonic acid, methallyl sulfonic acid, 3-methacrylamido-2-hydroxy propyl sulfonic acid, their salts and mixtures thereof. The preferred sulfonic compounds are 2-acrylamido-2-methylpropylsulfonic acid, 2-methacrylamido-2-methylpropylsulfonic acid and their salts. The most preferred sulfonic compound is 2-acrylamido-2-methylpropyl sulfonic acid.

If moiety (c) is present, any water-soluble unsaturated polyalkylene oxide compound may be used. Examples include, but are not limited to, allyl polyalkylene glycols, methallyl polyalkylene glycols, polyalkylene glycol acrylates, polyalkylene glycol methacrylates, and methoxy allyl polyalkylene glycols. The preferred unsaturated polyalkylene oxide compounds are unsaturated polyethylene compounds and unsaturated polypropylene equivalents thereof, and their ether derivatives. More preferably, unsaturated polyethylene compounds are used. Also, mixtures of polyethers formed from unsaturated polyethylene oxide with other polyalkylene oxides, such as propylene or butylene oxide, may be used. The unsaturated polyether chain may be capped with an alkyl, aralkyl, sulfonate or phosphonate group metal or ion, or uncapped.

The preferred unsaturated polyalkylene oxide compounds for use as moiety (c) are selected from the group consisting of allyl polyethylene glycols of the formula $CH_2=CH-CH_2 \ (OCH_2 \ CH_2)_n \ OH$ or $CH_2=CH-CH_2 \ (OCH_2CH_2)_n \ OCH_3$, wherein n is 5-10, and polyethylene glycol acrylates or methacrylates of the formula,

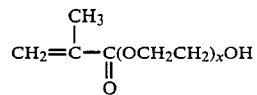

where R and $R^1$, which may be the same or different, are selected from the group consisting of H and lower alkyls, preferably $CH_3$, and wherein x is 1-20. The most preferred moieties are polyethylene glycol methacrylates of the formula

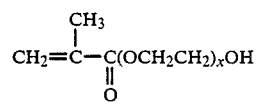

wherein x is 1 to 10.

Mixtures of the various monomers may be used, and nonionic monomers such as acrylamide, methacrylamide and acrylonitrile may also be present in the polymers. Polymers prepared using acrylic acid, alone or in combination with methacrylic acid, may also be used. Such polymers should have molecular weights less than 20,000.

The preferred polymers for use with the instant phosphonates are water soluble polymers having an intrinsic viscosity of about 0.05 to 2.5 dl/g, prepared from:

(a) 35 to 95%, by weight, of an unsaturated carboxylic compound selected from the group consisting of acrylic acid, methacrylic acid, their salts and mixtures thereof;

(b) 5 to 65%, by weight, of an unsaturated sulfonic compound selected from the group consisting of 2-acrylamido-2-methylpropyl sulfonic acid, 2-methacrylamido-2-methylpropylsulfonic acid, their salts and mixtures thereof, and (c) 0-40%, by weight, of a compound selected from the group consisting of $CH_2=CH-CH_2 \ (OCH_2CH_2)_n$ OH, $CH_2=CH-CH_2 \ (OCH_2 \ CH_2)_n \ OCH_3$, wherein n is 5-10,

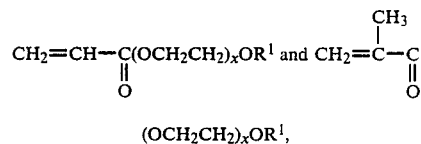

wherein x is 1-20 and $R^1$ is H or $CH_3$, preferably H.

More preferably, component (a) is 50 to 90%, by weight, acrylic acid or its salt and component, (b) is 10 to 50%, by weight, 2-acrylamido-2-methylpropylsulfonic acid or its salt. Moiety (c) may represent 0-30%, by weight, of the more preferred polymers. Also, for these more preferred polymers, the intrinsic viscosity is about 0.05 to about 0.5 dl/g. The most preferred terpolymers comprise 50 to 80%, by weight, (a) 10 to 30%, by weight, (b) and 5 to 15%, by weight, (c).

The use of at least one of the designated phosphonates is critical to the instant method in that these phosphonates, alone, minimize, inhibit and/or prevent silica/silicate deposition under severe saturation and/or temperature conditions. These compounds are efficient up to a pH of approximately 9.0.

The polymers of the instant invention, if used, are commonly available, and may be prepared by the method described in U.S. Pat. No. 4,680,135 which is hereby incorporated by reference into this specification. Molybdate and borate ion sources are also commonly available.

The compositions disclosed herein effectively control silica/silicate deposition in aqueous systems which have high alkalinity, high calcite saturation and/or high pH values. Such conditions are often times encountered as cycles of concentration increase. Thus, the instant phosphonate compositions provide silica/silicate protection under severe conditions where conventional silica control agents may be ineffective.

The instant compositions may be added to the system being treated by any convenient means, and the components may be added separately or in combination. A preferred method of addition is via makeup water streams.

Additionally, other conventional water treatment agents, including corrosion inhibitors such as tolyltriazole, can be used with the instant polymers.

EXAMPLES

The following examples demonstrate the use of the instant compositions to inhibit silica/silicate deposition. These examples are not intended to limit the scope of the instant invention in any way.

In these examples, the following compounds were tested:

Hexamethylene diamine tetra (methylene phosphonic acid), which is commercially available from Monsanto as Dequest 2051.

Diethylene triamine penta (methylene phosphonic acid), which is commercially available from Monsanto as Dequest 2060.

Ammonium molybdate, which is as a source of $MoO_4^{2-}$-ions.

Boric Acid, which is a source of borate ions.

AA/AMPSA[1], which is a 60/40 (w/w) polymer of acrylic acid and 2-acrylamido-2-methylpropyl sulfonic acid having a weight average molecular weight of about 8200, as determined by gel permeation chromatography (GPC).
[1] AMPS is a registered trademark of The Lubrizol Corporation.

AA/AMPSA/POE, which is a 70/20/10 (w/w/w) polymer of acrylic acid, 2-acrylamido-2-methylpropyl sulfonic acid and polyethylene glycol methacrylate of the formula:

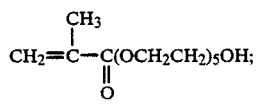

having a weight average molecular weight of approximately 10,000, as determined by GPC.

PAA, which is a homopolymer of acrylic acid having a molecular weight of approximately 2200.

Test Method

The following procedure was used to evaluate the ability of the instant polymers to prevent the formation and deposition of calcium and magnesium silicates.

A two-liter polypropylene flask having a side arm was filled to the 1500 ml level with makeup water as described in Table I. The temperature of the makeup water was controlled and maintained by immersing an electrically heated 304 stainless steel heat-exchanger into the polypropylene flask. A refractive index liquid level sensor was placed in the side arm to maintain a constant volume in the flask by controlling a solenoid valve on inlet line from the makeup water reservoir.

Evaporation was achieved by passing filtered dry air or nitrogen at a regulated and measured rate through a teflon tube placed at the bottom of the flask. The makeup water was concentrated to various levels (i.e., cycled-up) by controlling the rate of aeration. The pH of the system was controlled by feeding acid or alkali as required by the set point pH on a pH-stat device.

After reaching the targeted cycles of concentration, the cycles were maintained constant for several days. This simulated the operating procedure commonly used in industrial cooling towers. In this case the makeup water in the reservoir was replaced by distilled water to stop further concentration. The makeup water described in Table I was selected because it is stable at room temperature and it gives a sufficient induction time to establish the concentration process before any mineral precipitation occurs. The pH of the makeup water was adjusted to 8–9 and was maintained at the selected pH in the flask during the entire cycling up process. The makeup water contained 10 mg/L of the designated inhibitor. Aliquots were withdrawn at various time intervals, filtered, and analyzed for chloride, calcium, magnesium and silica. The cycles of concentration were determined based on the chloride concentration in the cycled up water. The expected concentration of the other species in solution was then calculated based on the cycles of concentration. The amount of deposit on the heat exchanger was determined by weighing the heat exchanger at the beginning and at the end of each run.

The results are shown in Tables II, III and IV.

TABLE I

| CHEMICAL COMPOSITION OF THE MAKEUP WATER | |
|---|---|
| Ion | Total Concentration (mg/L) |
| Calcium | 100 |
| Magnesium | 7.5 |
| Sodium | 153 |
| Chloride | 199 |
| Sulfate | 219 |
| Silica | 150 |

TABLE II

Inhibition of Silica/Silicates at pH 9.0 ± Using Air on Nitrogen For Cycling-Up and Holding Constant Cycles (1.8–2.0) for 2–3 days

| Additive | Inhibitor Dosage (mg/L) | Cycling-up Medium | % Inhibition Deposit | % Retention in Solution (mg/L) | | |
|---|---|---|---|---|---|---|
| | | | | SiO$_2$ | Ca | Mg |
| Dequest 2051 | 10 | Air | 82 | 82 | 40 | 33 |
| | 20 | Air | 85 | 88 | 21 | 0 |
| | 10 | N$_2$ | 89 | 72 | 84 | 31 |
| Dequest 2060 | 10 | Air | 95 | 82 | 83 | 72 |
| | 10 | N$_2$ | 98 | 89 | 93 | 79 |
| AA/AMPSA | 2 | Air | * | 80 | 3 | 62 |
| | 10 | Air | 80 | 88 | 56 | 62 |
| | 10 | N$_2$ | 96 | 79 | 88 | 63 |
| AA/AMPSA/POE | 2 | Air | * | 82 | 3 | 17 |
| | 5 | Air | * | 84 | 0 | 32 |
| | 10 | Air | 29 | 81 | 2 | 0 |
| | 10 | N$_2$ | 80 | 84 | 79 | 67 |
| Dequest 2051 + | 5/5 | Air | 71 | 70 | 31 | 0 |

TABLE II-continued

Inhibition of Silica/Silicates at pH 9.0 ± Using Air on Nitrogen For Cycling-Up and Holding Constant Cycles (1.8-2.0) for 2-3 days

| Additive | Inhibitor Dosage (mg/L) | Cycling-up Medium | % Inhibition Deposit | % Retention in Solution (mg/L) | | |
|---|---|---|---|---|---|---|
| | | | | $SiO_2$ | Ca | Mg |
| AA/AMPSA | 20/5 | Air | 87 | 85 | 50 | 68 |
| Dequest 2060 + AA/AMPSA | 20/5 | Air | 91 | 72 | 72 | 65 |

*Deposit Weight Is Higher Than On Control

TABLE III

Inhibition of Silica/Silicates at pH 8.8 ± 0.2 Using Air For Cycling-Up and Holding Constant Cycles (1.8-2.0) for 7-8 days

| Additive | Dosage (mg/L) | % Inhibition Deposit | % Retention in Solution (mg/L) | | |
|---|---|---|---|---|---|
| | | | $SiO_2$ | Ca | Mg |
| Dequest 2051 | 10 | 87 | | | |
| Dequest 2060 | 10 | | | | |
| AA/AMPSA/POE | 10 | 96 | 75 | 86 | 82 |
| Dequest 2060 + AA/AMPSA/POE | 10/10 | 100 | 68 | 69 | 23 |
| Dequest 2060 + AA/AMPSA/POE + $MoO_4^{2-}$ | 10/10/20 5/5/10 | 100 93 100 10/10/10 100 | 85 80 42 64 | 91 36 22 56 | 76 20 0 35 |

TABLE IV

Inhibition of Silica/Silicates at pH 8.8 ± 0.2 Using Air For Cycling-Up Make-Up Water* and Holding Constant Cycles (1.8-2.0) For 7-8 Days

| Additive | Dosage (mg/L) | % Inhibition Deposit | % Retention in Solution (mg/L) | | |
|---|---|---|---|---|---|
| | | | $SiO_2$ | Ca | Mg |
| Dequest 2060 | 10 | 98 | 67 | 62 | 52 |
| AA/AMPSA | 10 | 85 | 65 | 10 | 8 |
| AA/AMPSA/POE | 10 | 84 | 67 | 3 | 0 |
| $MoO_4^{2-}$ | 20 | 16 | 58 | 3 | 0 |
| Dequest 2060 + $MoO_4^{2-}$ | 10/20 | 87 | 46 | 8 | 9 |
| Dequest 2060 + AA/AMPSA/POE | 10/10 | 94 | 79 | 65 | 51 |
| Dequest 2060 + AA/AMPSA/POE + $MoO_4^{2-}$ | 10/10/20 | 99 | 79 | 82 | 78 |
| Dequest 2060 + PAA + $MoO_4^{2-}$ | 10/10/20 | 97 | 47 | 21 | 17 |
| Dequest 2060 + AA/AMPSA/POE + $BO_3^{3-}$ | 10/10/20 | 98 | 67 | 45 | 60 |

*with 100 mg/L $HCO_3^-$ alkalinity added to the makeup water

What we claim is:

1. A method for controlling silica/silicate deposition, including calcium and magnesium silicate, in an aqueous system having a pH of from about 8 to about 9 comprising adding to said system an effective amount of a composition comprising: (A) a phosphonate selected from the group consisting of diethylene triamine penta(methylene phosphonic acid) and salts thereof; and (B) a water soluble terpolymer comprising:
   (a) about 50 to 80%, by weight, of an unsaturated carboxylic compound selected from the group consisting of acrylic acid, methacrylic acid, their salts and mixtures thereof;
   (b) about 10 to 30%, by weight, of an unsaturated sulfonic compound selected from the group consisting of 2-acrylamido-2-methylpropyl sulfonic acid, 2-methylpropyl sulfonic acid, 2-methacrylamide-2-methylpropyl sulfonic acid, their salts and mixtures thereof; and
   (c) about 5 to 15%, by weight, of an unsaturated polyalkylene oxide compound selected from the group consisting of: $CH_2=CH-CH_2(OCH_2CH_2)_nCH$, $CH_2=CH-CH_2(OCH_2CH_2)_nOCH_3$,
   wherein n is 5-10,

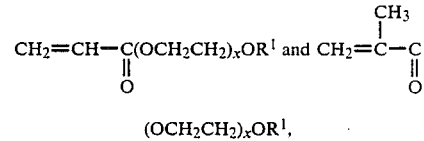

$(OCH_2CH_2)_xOR^1$, wherein $R^1$ is H or lower alkyl, x is 1-20 and said polymer has an intrinsic viscosity of 0.05 to 2.5 dl/g; and wherein the weight ratio of (A):(B) ranges from about 1:3 to about 3:1.

2. The method of claim 1, wherein said phosphate is added at a dosage of from about 1 to about 200 ppm.

3. The method of claim 1, wherein said effective amount of said composition is from about 1 to about 200 ppm.

4. The method of claim 1, wherein a molybdate ion source or a borate ion source is added as component (C), wherein the weight ratio of (A):(C) ranges from about 1:5 to about 5:1.

5. The method of claim 4, wherein (C) is a molybdate ion source.

* * * * *